(12) United States Patent
Anthony et al.

(10) Patent No.: US 6,717,570 B2
(45) Date of Patent: Apr. 6, 2004

(54) SIGNAL PROCESSING APPARATUS

(75) Inventors: Michael Anthony, Dun Laoghaire (IE); Robert Treen, Dun Laoghaire (IE)

(73) Assignee: Antree Systems Limited, Dun Laoghaire (IE)

( * ) Notice: Subject to any disclaimer, the term of this patent is extended or adjusted under 35 U.S.C. 154(b) by 361 days.

(21) Appl. No.: 09/740,625

(22) Filed: Dec. 19, 2000

(65) Prior Publication Data

US 2001/0013857 A1 Aug. 16, 2001

(30) Foreign Application Priority Data

Dec. 22, 1999 (IE) .............................................. S99/1087

(51) Int. Cl.[7] .............................. G09G 5/08; G09G 5/00
(52) U.S. Cl. ....................... 345/157; 345/161; 345/856; 345/810; 345/589
(58) Field of Search ................................ 345/156, 157, 345/161, 589, 810

(56) References Cited

U.S. PATENT DOCUMENTS

| 4,766,423 A | * | 8/1988 | Ono et al. .................. 345/159 |
| 5,883,617 A | * | 3/1999 | Yoshikawa .................. 345/157 |
| 6,226,010 B1 | * | 5/2001 | Long .......................... 345/594 |

* cited by examiner

*Primary Examiner*—Joseph Mancuso
*Assistant Examiner*—Antonio A Caschera
(74) *Attorney, Agent, or Firm*—Jay H. Maioli

(57) ABSTRACT

Control signal generating apparatus generates a first plurality of output signals from a second plurality of input signals. For each output signal, a locus generator defines a sequence of combinations of values corresponding to the input signals forming a line-like locus in the space defined by the input signals. For each locus generator, there is a distance value signal calculator for evaluating an output signal having a value determined by the distance in the space of the point, that is, the cursor point, represented by the combination of input signal values relative to the locus. The distance value is the distance along the locus corresponding to the projection of the point onto the locus.

15 Claims, 2 Drawing Sheets

SIGNAL PROCESSING APPARATUS

FIELD OF THE INVENTION

The present invention relates to control apparatus, and more particularly (though not exclusively) to apparatus which generates control signals or data values in response to inputs which may be manual or derived from some other source including, but not limited to industrial sensors such as thermocouples, photo-electric, flow proximity etc.

BACKGROUND OF THE INVENTION

There are many situations where it is desirable or necessary to control two or more entities simultaneously by suitable electrical signals. If two such signals are required, one standard manual technique is to provide a joystick. There are many applications of joysticks, ranging from computer games to adjustment of car door rear-view mirrors to the control of vehicles. Other systems, in the process control industry for example, will take inputs from sensors and use them via a process control system to produce control data which is applied to the application to keep it stable, or operating within desired parameters. This invention, once programmed (a process that happens in existing process control systems) will control the application without operator intervention, if required.

SUMMARY OF THE INVENTION

The invention provides control signal generating apparatus for generating a first plurality of output signals from a second plurality of input signals. For each output signal, locus generating means define a sequence of combinations of values corresponding to the input signals forming a locus in the space defined by the input signals; and for each locus generating means, there is a distance value signal calculator for evaluating an output signal having a value determined by the distance in said space of the point (the cursor point) represented by the combination of input signal values relative to the locus.

Preferably, the distance value is the distance along the locus corresponding to the projection of the point onto the locus and the locus is a linear locus (as contrasted with a 2-dimensional or higher-dimensional locus). A locus may be a straight or curved line (which may form a closed loop), and may consist of two or more separate segments.

Setting means may be provided for adjusting the loci defined by the locus generating means.

Preferably there is an input device controllable by an operator to generate the second plurality of input signals, and a display device for displaying the cursor point and, for each locus generating means, the locus defined thereby. The display device preferably also displays, on each locus, the projection of the cursor point onto that locus. The input device may include switch control means for controlling, e.g., when the apparatus responds to changes in the input signals, or for controlling the mode of operation of the apparatus.

The number of dimensions of the space defined by the input signals will be the same as the number of input signals, and can conveniently be a Euclidean space. If there is no display device, then the space will be an abstract or conceptual space; if there is a display device, then the space will be real in the sense that it is displayed by the display device. The display device may display the space in a reduced or projected form, e.g. if the space is 3-dimensional and the display device is 2-dimensional.

The apparatus may be used to compress a set of variables corresponding to the number of output signals. For this, the set of variables is compared with the set of output signals, and the input signals are adjusted to reduce the difference therebetween. The set of input signals will therefore represent the set of variables. If the number of input signals is chosen to be less than the number of output signals (i.e. the number of variables in the set of variables), a data compression will thereby be achieved. The apparatus may similarly be used to reverse this process.

The system may be implemented on a general-purpose computer. The system may also be implemented using Field Programmable Gate Arrays (FPGA), Application Specific Integrated Circuits (ASIC), microcontroller circuitry or similar technology.

BRIEF DESCRIPTION OF DRAWINGS

A control signal generating apparatus embodying the invention will now be described, by way of example, with reference to the drawings, in which.

DETAILED DESCRIPTION OF THE INVENTION

Figure 1:
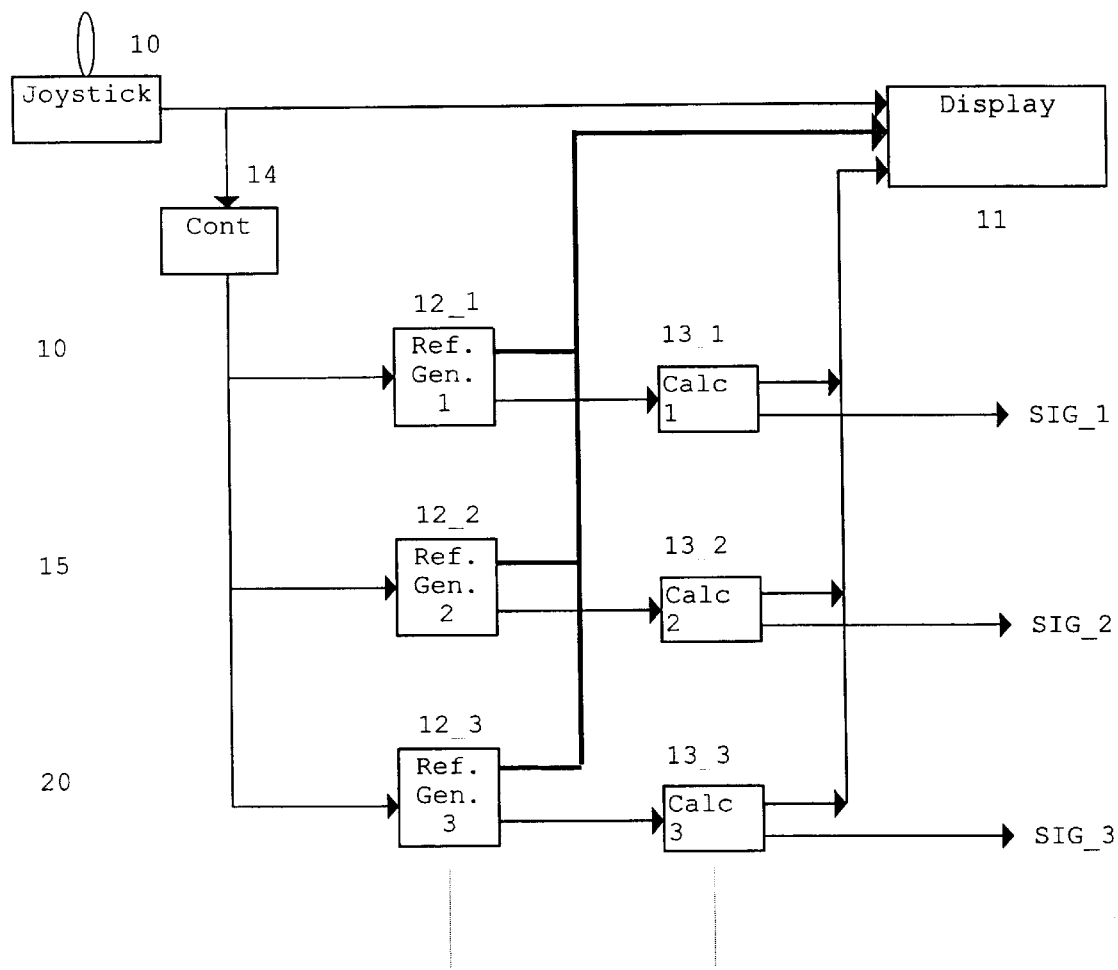
FIG. 1 is a simplified block diagram of the apparatus.

Referring to FIG. 1, the apparatus comprises a joystick device 10, a display unit 11, and a plurality of locus generators 12-1, 12-2, etc. and associated signal calculators 13-1, 13-2, etc. The system can be implemented on a general-purpose computer with a joy-stick input means. The joystick device generates X and Y (horizontal and vertical) signals which are fed to the display device 11 to generate a cursor point p thereon.

The point p can be moved around the screen in the usual way by means of the joystick.

Each of the locus generators 12 defines a respective locus and generates a display of that locus on the display device 11. In the apparatus described below, the display device generates a 2-dimensional display, and each locus is a straight line segment. Each generator has stored therein the parameters of the line segment which it generates. The generators 12 also pass their parameters to the signal calculators 13, which are also fed with the signals from the joystick device 10.

Figure 2:
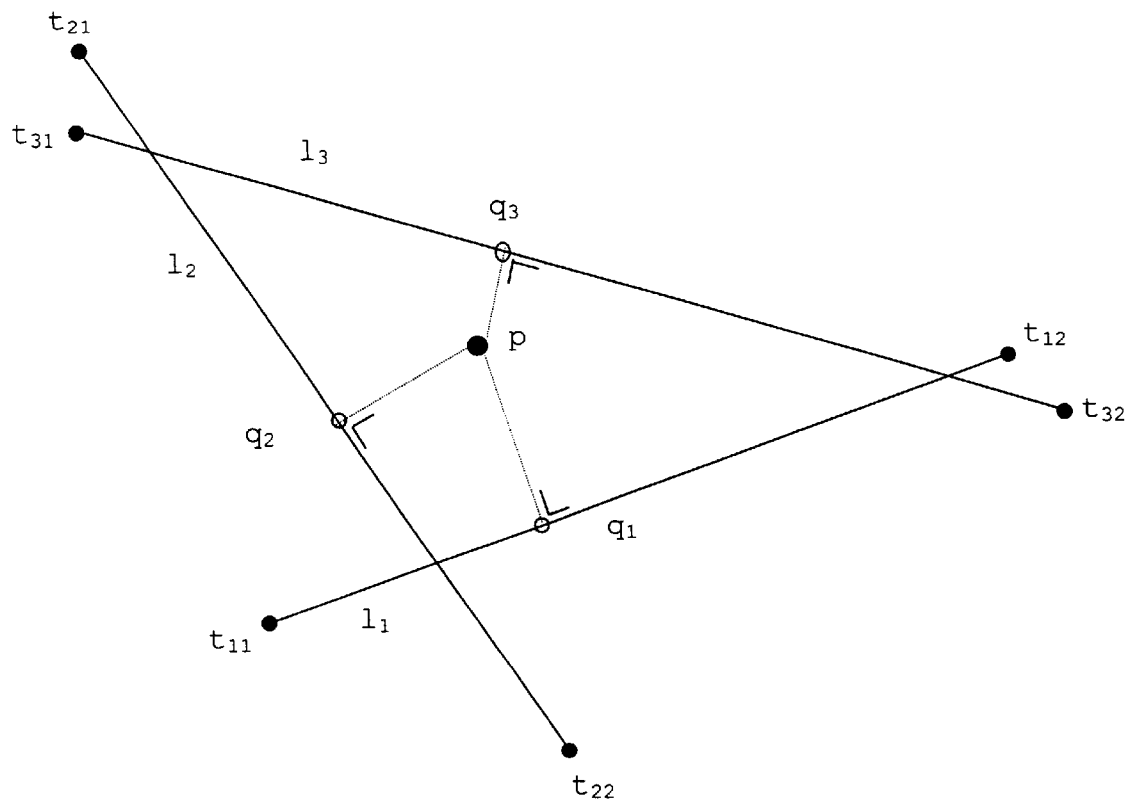
FIG. 2 shows a typical display generated by the apparatus.

Generator 12-i defines a line segment $l_i$ with terminal points $t_{i,1}$ and $t_{i,2}$ in which each terminal point $t_{ij}, j \in \{1,2\}$ has the co-ordinates $(x_{t_{ij}}, y_{t_{ij}})$. The co-ordinates of the terminal points of a given line segment are used to generate its parameters. The generator passes signals to the display device 11 to cause the line segment and its terminal points to be drawn thereon, as shown in FIG. 2.

Calculator unit 13-1 calculates the perpendicular projection of the point p onto the line segment $l_1$ (shown in FIG. 2 as the point $q_1$), and passes the co-ordinates of this point to the display unit 11, causing the point to be drawn thereon on the line $l_1$ as shown. (The projection procedure is discussed below.) If desired, the calculator unit may also cause the projection line from the cursor point p to its projected image point $q_1$. The calculator unit also calculates the fraction of the length $t_{11}t_{12}$ which $t_{12}q_1$ constitutes (i.e. calculates the value of a term $\gamma_1$ in which $\gamma_1$ is given by $\gamma_1 = t_{12}q_1/t_{11}t_{12}$) and emits the resulting value as a signal SIG-1.

Similarly, generator 12-2 defines a line segment $l_2$ with terminal points $t_{21}$ and $t_{22}$. The associated calculator unit 13-2 determines the position of the projection $q_2$ of point p onto the line segment $l_2$, causes the point $q_2$ to be displayed, and determines the distance of $q_2$ along the line segment $l_2$ from $t_{22}$ (taking $t_{21}t_{22}$ as the unit distance for that line segment), and emits that value as the signal SIG-2.

The apparatus enables the two locus line segments $l_1$ and $l_2$ to be defined in any desired positions. The operator, by means of the joystick, directly controls the position of a control point p. Two signals SIG-1 and SIG-2 are generated, each of which is directly proportional to the distance of the projection of the point p from a terminal point on the corresponding locus line segment.

Movement of the original point p in a direction parallel to a given locus line segment $l_i$ would enable the correspondingly moving projected point and the locus to be considered as a slider. The present invention enables several such sliders to be controlled simultaneously.

The apparatus as described so far uses a single cursor point p and an associated set of loci $l_1$ and $l_2$ for generating two output signals SIG-1 and SIG-2. If say four independent output signals are required, then a duplicate apparatus can be dedicated to the third and fourth output signals. However, a combined apparatus with a single display device can be used, with the display device showing two separate displays, one for the first two signals and the other for the third and fourth signals. Each display will have its own moving cursor point and its own pair of loci generated by an associated pair of locus generators (with an associated pair of calculator units for determining the relevant pair of signals). The two cursor points may be controlled by separate respective joysticks or the like, or by a single joystick which can be switched between the two cursor points or the single joystick may control both points simultaneously.

The two displays can be displayed side by side, or superimposed on the same screen area provided that they are suitably distinguished, e.g. by being displayed in different colours. The system as described so far is 2-dimensional and generates 2 output signals. It is possible to provide a third locus generator 12-3 and associated signal calculator 13-3, as shown, generating a third locus $l_3$ on the display and a third output signal SIG-3. This system is still 2 dimensional and it generates three outputs.

One application of such an invention is for colour control, where the 3 lines segments $l_1$, $l_2$ and $l_3$ correspond to the primary colours red, green, and blue. Moving the cursor point around will move the projection points on the 3 locus lines and so adjust the amounts of the three primary colours in the colour being generated. (The system preferably also generates a patch of the resulting colour on the screen.) By moving the point p around in the triangle, a variety of different colours can be generated. It is convenient to set the reference points at the vertexes of the triangle, and for the calculation units to limit the output signals to the range 0 to 1.

More generally, there may be a considerable number of locus lines, so that a considerable number of output signals can be controlled and varied simultaneously by moving a single cursor point. Depending on the particular circumstances, the locus lines may all radiate from a single point, or be more randomly arranged.

More generally, the system may include several cursor points and several locus lines, which may be separated into sets, one set for each cursor, or may be partially or wholly common to all cursor points. The total number of output signals will then be the sum of the number of locus lines for each cursor. If each cursor point has the same number of locus lines, the total number of outputs will be the product of the number of locus lines and the number of cursors.

Of course, if 3 or more output signals are generated from a given 2-dimensional locus set, the output signals will not be in general all independent; any one of them can be generated from the other two. However, the display makes the values of all immediately evident to the operator, and it is more elegant to generate all the signals in the same way.

The system can also be used in some situations to match a multi-variable signal, i.e. a set of variables. The set of variables is displayed as a bar chart or histogram, and the system is used to generate a similar set of variables. The cursor will be moved until an acceptable match between the two sets of variables is achieved. The original set of variables can then be represented by the position of the cursor, giving a compression of the original data. As an example, the system could utilise 200 loci with 10 inputs. This gives a 20:1 compression. The compression system would be automated—the matching of the 200 output values to the 200 data values yielding a 'position' in 10 ordinates for the input value. The decompression would simply be applying the 10 values as an input cursor point to the system and reading the 200 output values thus generated. Obviously this has applications in Video and Audio streaming, where loss-less compression is wanted.

The apparatus has been described as including a joystick control unit. The joystick can be position-responsive or force-responsive; that is, it can control either the position or the rate of movement of the point P in dependence on the displacement of the joystick from its central position. More generally, however, any convenient control device can be used, such as a mouse or track-ball, or a touch pad or touch screen. All that is required is some device which can conveniently be used to control the movement of the cursor point in 2 dimensions. Even more generally, the two inputs to the system can come from any external sensors or data stream.

If desired, the control device may also be provided with one or more switches, such as the "click" controls of a mouse. The outputs of these switches can be used as additional control signals of binary type, supplementing the analogue control signals SIG-1, etc. produced by the apparatus. Such switch controls can be used to allow the cursor point to be moved to a desired position before the output signals are changed to the values corresponding to that position. Similarly the external data stream can be used to generate 'switch' values.

Switch controls can also be used for more general control purposes. Thus the system can be switched between different displays on the same screen. A switch control can also be used to allow the selection of desired locus lines between active and passive. A selected locus line will be active, so that when the cursor point moves, its projection on that locus moves and the corresponding output signal changes; an unselected locus line will be passive, with the projection point on that locus being stationary and the corresponding output being held steady.

Switch controls can also be used to switch between modes, such as the primary or operational mode as discussed so far and control modes. A typical control mode will enable the operator to adjust the position of a locus, e.g. by moving the reference points $t_{11}$ and $t_{12}$ to desired positions on the screen. For this, a control unit 14 is provided. This control unit responds to the switch signals from the joystick unit 10 to select a desired reference generator unit and pass reference point positioning signals thereto.

The apparatus as described so far is 2-dimensional, using a flat screen display. The present principles can however be readily extended to 3 dimensions. This will normally be used to generate 3 independent output signals, although more outputs can be generated using extra loci. For this, a possible requirement is a 3-dimensional display, or at least a method of displaying all the relevant data. If one wishes to use a true 3 dimensional display one can for example achieve this by using two display screens, one for each eye, generating displays with different parallaxes. Other methods can also be used to display the information, and these include, and are not limited to—2-dimension perspective displays, bar charts and tabulation of the data.

In addition, the control device must allow ready control of a moving cursor point in the 3 dimensional cursor space. With a joystick, for example, the control arm can be made extensible, so that it can be moved up and down to provide a third dimension of control, or it may be rotatable so that its rotation provides the third dimension of control.

Also, for each output signal, the associated locus generator must generate a locus in the 3-dimensional space and the associated signal calculator must calculate a distance function for the distance along the locus line of the projection of the point onto that locus in the 3-dimensional space.

The present technique can in principle be extended to more than 3 dimensions, provided that a suitable display device displaying more than 3 dimensions is used; for example, the fourth dimension might be indicated by suitable colouring, alternatively one may use bar charts, tabulation, or some other methods. The method of display is chosen for the application, as is the number of dimensions. Some applications may not need a display at all. The present technique finds wide application in such diverse fields as MIDI systems, animation, morphing control, robots, machine control, artificial limbs, virtual reality, and gaming. In some cases, such as control of an animatronic puppet, the operator may not be concerned with the display during operation, but can instead watch how the puppet responds and exercise their control accordingly.

Projection Calculation

The positions of the various points associated with the locus lines may be determined in various ways. For convenience, we will consider locus line $l_1$.

In terms of pure geometry, the lengths of the locus line $t_{11}t_{12}$ and two lines $pt_{11}$ and $pt_{12}$ from the cursor to the ends of the locus can easily be calculated, and from these, the area of the triangle can be calculated by Heron's formula (using the semi-perimeter of the triangle). The length of the perpendicular $pq_1$ from the cursor point to the locus can then be found from the fact that the area of the triangle is half the product of this length and the length of the locus. The desired length $t_{11}q_1$ can then be found by applying Pythagora's formula to the triangle $\Delta pt_{11}q_1$.

The above approach can be modified by applying Pythagora's formula to the two triangles $\Delta pt_{11}q_1$ and $\Delta pt_{12}q_1$. Each formula gives an expression for the square of the length of the perpendicular $pq_1$, and by equating these two expressions, a formula for the desired length $t_{11}q_1$ can be derived, giving $$t_{11}q_1 = t_{11}t_{12} + (pt_{11}^2 + pt_{12}^2)/t_{11}t_{12} \quad (1)$$

Alternatively, the situation can be analysed in terms of co-ordinate geometry, since the positions of the various points associated with the locus are likely to be given in terms of XY co-ordinates. Since the point $q_1$ is on the locus $t_{11}t_{12}$ it can be expressed as $\gamma_1(t_{11})+(1-\gamma_1)t_{12}$. The lines $pq_1$ and $t_{11}t_{12}$ are perpendicular, and the product of their slopes is therefore $-1$ (the slope of a line can be derived directly from the co-ordinates of its endpoints). From this, the value of $\gamma_1$ can be calculated in terms of the co-ordinates of p, thus $$\gamma_1 = \frac{(x_p - x_{t_{12}})(x_{t_{11}} - x_{t_{12}}) - (y_p - y_{t_{12}})(y_{t_{12}} - y_{t_{11}})}{(y_{t_{11}} - y_{t_{12}})^2 + (x_{t_{11}} - x_{t_{12}})^2} \quad (2)$$

(This is linear in the co-ordinates of p, whereas equation (1) has squares involving those co-ordinates. However, in equation (1), the squares cancel out leaving only linear terms.)

The denominator of this formula, and various other components of it, can be pre-calculated. The calculator unit then has to perform only a very simple calculation, involving two products and two sums, to determine $\gamma_1$, and a few further similar calculations to determine the position of $q_1$ for display on the display unit 11.

The above equation can be considered as a function $f_1(x_p, y_p) \rightarrow \gamma_1$, defined and stored by the generator unit 12-1, which transforms the co-ordinates of the point p to a value $\gamma_1$. Using the projection method described, a set of values $\Gamma = \{\gamma_1\}$, $i = 1 \ldots n$ has a corresponding set of projection vectors describing a family of lines perpendicular to the original locus. Movement of the cursor point p along any line of this family leaves the value function unchanged.

All these approaches can be generalised to 3 or more dimensions. The pure geometry approaches apply automatically regardless of the number of dimensions; for the co-ordinate geometry approach, the slopes of the two perpendicular lines have to be expressed in terms of their direction ratios or cosines.

In both the above examples the distance $\gamma$ is calculated to lie in the range 0 to 1. If desired, the distance may be multiplied by a scaling factor, and the denominator of the formula can be included in the scaling factor if desired. Instead of a simple scaling factor, non-linear scaling (e.g. quadratic or inverse) can be used, giving a value which changes at different rates along different parts of the line $l_1$. In terms of the value function, this changes the spacing between the value function lines.

The formula given above gives values ranging from 0 to 1 if the projection point $q_1$ lies on the line interval from $t_{11}$ to $t_{12}$, but negative values or values greater than 1 if the point p is projected onto the line of which $t_{11}t_{12}$ is a segment to some point outside of the segment boundaries. In some situations it is desirable to limit the value of the signal to the range 0 to 1. This can easily be done by arranging the calculation unit to limit the value to that range, and to confine the position of the projection point $q_1$ accordingly. In terms of the value function, this extends the $k=0$ and $k=1$ value function lines to the "external" areas bounded by those lines.

The locus can if desired be split into two or more separate segments; in other words, some parts of the locus can be deleted. A smooth movement of the cursor point parallel to the locus past the gap between two segments will then result in the projection point "sticking" for a time at the end of one segment and then jumping to the adjacent end of the next segment (and "sticking" there until the cursor becomes level with the end of that segment).

The locus described above is a straight line, and this is the simplest form for the locus. However, it is possible to have a curved locus. Although such a locus can in principle be defined in terms of mathematical functions, it will normally be preferable to use numerical procedures, defining it as a series of points, each of which is defined by its co-ordinates (in whatever number of dimensions is being utilised by the system). The locus will consist of a sequence of segments, each defined by an adjacent pair of points.

To determine the projection of the cursor point onto the locus, the position of the projection onto each segment in turn may be calculated, to find the segment for which the projection is between the ends of that segment. The corresponding value can then be determined by adding the distance along that segment to the lengths of the preceding segments. To ease the calculation procedure, the lengths of the segments can be pre-calculated and stored in a list.

It may happen that a line drawn from the cursor point to one of the points defining the locus forms slightly obtuse angles with both segments at that point. In this event, the perpendicular projections of the cursor point onto the segments will give a value <0 for the first segment and >1 for the second (taking the values as running from 0 to 1 along each segment from one end-point to the other). In this case, the perpendicular projection should be taken as meeting the locus at the junction of the two segments.

Another option for finding the projection of the cursor onto the curve is to determine the distance of the cursor from each in turn of the points defining the curve. When the shortest distance is found, the two segments ending at that point can be investigated to see whether a shorter projection can be found to somewhere in the interior of one of those segments.

If the cursor moves smoothly, then the projection point will usually move smoothly as well. The projection point can therefore be tracked along the locus.

If desired, interpolation and smoothing techniques can be used to generate a smooth curve running through the points used to define it. A corresponding elaboration of the procedures for finding the projection of the cursor onto the locus and the distance of the projection point along the locus will of course be required.

As with a straight locus, a curved locus can consist of two or more separate segments.

It is also possible for a locus to be added or deleted, or the position and/or shape of a locus to be made adjustable or to change during operation. This may be done by switching to a different mode, as described above, or automatically, e.g. in dependence on the status of whatever system is being controlled by the output signals.

However the locus is defined, it will be possible to calculate a true perpendicular projection from the cursor point to it, although, for ease of calculation it may be more convenient to define an approximate projection procedure, which gives a projection point which is not an exact perpendicular projection.

In terms of the transform function $f_i(x_p,y_p)$, using a curved locus is likely to result in the corresponding projection vectors becoming curved. The locus intersects all of the lines of this family at right angles, and these lines can loosely be defined as "parallel"; more precisely, they never intersect each other. It may be more convenient to define the transform function, use that directly to calculate the value for the cursor point, and then use that to determine the position of the projection point $q_i$ on the locus.

With a curved locus and a suitable position for the cursor point p, there may be more than one perpendicular from the cursor point to the locus. This will give two projections onto the locus, with an ambiguity in the distance along the locus. This can be dealt with in various ways. For example, an approximate value function can be used which is computationally convenient or a relatively simple mathematical function and, for every point in the plane, gives a unique value for that point. Another option is to take the projection with the shortest perpendicular to the point p. A further option is to require the projection point $q_1$ to move continuously along the locus; this will result in a hysteresis, with the position of the projection point depending on the past movement or history of the point p.

The invention can be regarded as performing a co-ordinate conversion from the original cursor co-ordinates to a set of co-ordinates defined by the locus and the associated value function.

If the cursor space is 3-dimensional, then (provided the distance value is taken as the distance along the locus corresponding to the projection of the point onto the locus) the locus remains a (straight) line, but the value function will define a family of parallel planes all perpendicular to the locus line. More generally, if the locus line is curved or the projection procedure is defined more generally, the value function will define a family of curved surfaces, none of which intersect each other, and with the locus line passing perpendicularly through each of them. The principles obviously extend upwards if more dimensions are used.

What is claimed is:

1. Control signal generating apparatus for generating a first plurality of output signals from a second plurality of input signals, each input signal corresponding to a dimension in a multi-dimensional space, a combination of values of the input signals defining a cursor point in said space, said apparatus comprising:

locus generating means for determining, for each output signal, a locus in said space of an output signal; and for each output signal, signal generating means having a distance value signal calculator for evaluating an output signal having a value determined by the distance in said space of the cursor point, relative to the output signal locus.

2. Control signal generating apparatus according to claim 1 wherein each distance value is the distance along the output signal locus corresponding to the projection of the cursor point onto the locus and the output signal locus is a linear locus.

3. Control signal generating apparatus according to claim 2 including an input device controllable by an operator to generate the second plurality of input signals, and a display device for displaying the cursor point and each output signal locus.

4. Control signal generating apparatus according to claim 3 including display means for displaying, on each output signal locus, the projection of the cursor point onto that locus.

5. Control signal generating apparatus according to claim 4 wherein the display means provides a 2-dimensional display.

6. Control signal generating apparatus according to claim 4 wherein the display means provides a 3-dimensional display.

7. Control signal generating means according to claim 1 wherein the locus generating means generate respective straight line loci associated with each output signal.

8. Control signal generating means according to claim 1 wherein at least one of the locus generating means generates a curved locus associated with an output signal.

9. Control signal generating means according to claim 3 wherein the input device includes switch control means.

10. Control signal generating means according to claim 4 including means for displaying a plurality of independent displays on the display means.

11. Control signal generating apparatus according to claim 1 further including setting means for adjusting the loci defined by the locus generating means.

12. Control signal generating means according to claim 4 including means for displaying a first set of variables, means for deriving a second set of variables from the first plurality of output signals, comparison means for comparing the first and second sets of variables and producing a control signal proportional to the difference between the first and second sets of variables, and adjustment means controlled by the control signal for adjusting the second plurality of input signals so as to reduce the control signal.

13. Control signal generating apparatus according to claim 1 wherein the number of output signals exceeds the number of input signals.

14. Control signal generating apparatus according to claim 1 wherein a sequence of combinations of input signals defines a locus of said cursor in said space.

15. Control signal generating apparatus according to claim 14 wherein said sequence is time ordered.

* * * * *